March 20, 1951 G. H. HANSON 2,546,031
REGENERATION OF ALUMINA-CHROMIA CATALYST
Filed Oct. 26, 1948
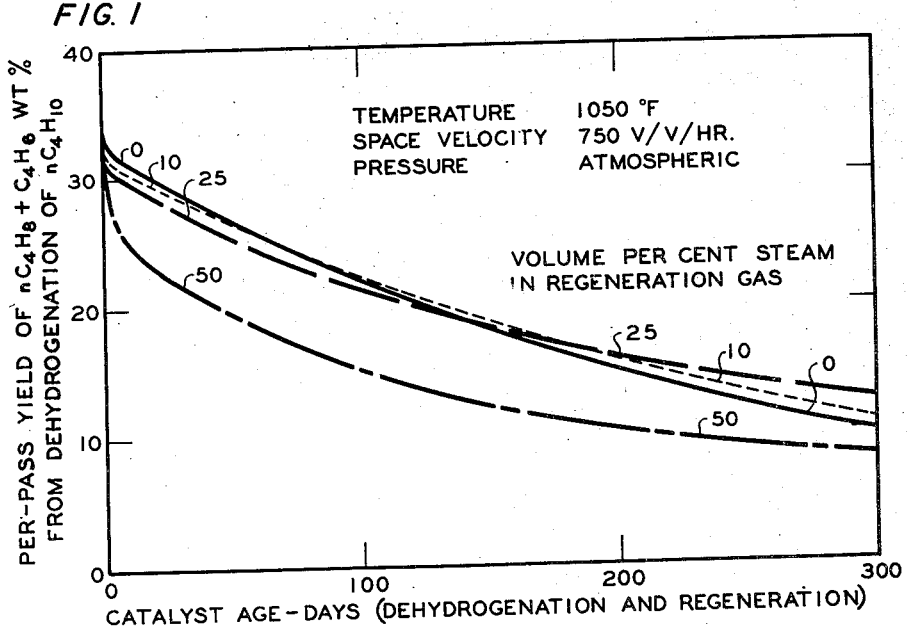
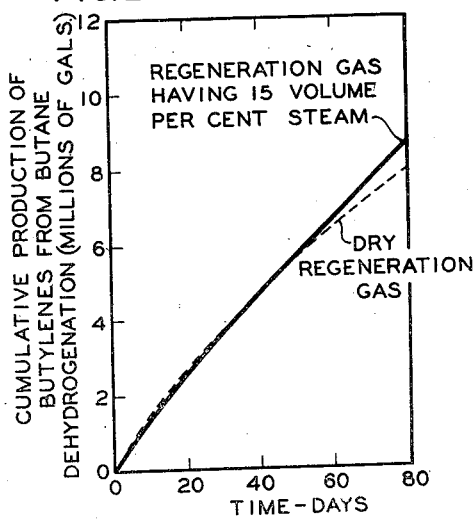
INVENTOR.
GEORGE H. HANSON
BY Hudson and Young
ATTORNEYS Patented Mar. 20, 1951

2,546,031

UNITED STATES PATENT OFFICE 2,546,031

REGENERATION OF ALUMINA-CHROMIA CATALYST

George H. Hanson, Bartlesville, Okla., assignor to Phillips Petroleum Company, a corporation of Delaware Application October 26, 1948, Serial No. 56,546

15 Claims. (Cl. 260—680)

This invention relates generally to a process for the catalytic dehydrogenation of hydrocarbons to less saturated hydrocarbons. This invention is particularly useful for the regeneration of catalysts for the non-destructive dehydrogenation of hydrocarbons to form corresponding less saturated hydrocarbons. In one of its aspects this invention relates to the catalytic dehydrogenation with a chromia-alumina catalyst to form less saturated $C_4$ hydrocarbons and to a method for regenerating "steam-sensitive" catalysts that are used to effect the dehydrogenation reaction.

In recent years the dehydrogenation of hydrocarbons to form less saturated hydrocarbons such as olefins and diolefins has been assuming increasing importance, particularly as a source of compounds for the production of other organic compounds. For example, it is well-known that paraffins can be dehydrogenated to olefins which are useful in numerous organic reactions, such as alkylation reactions to form essential components of high-octane-rating gasoline and to form alkylated phenolic and other aromatic compounds which are widely used at present for the production of synthetic detergents. Also, paraffins and olefins may be dehydrogenated to form diolefins which have been used extensively in the production of synthetic rubber. It has been well recognized for many years that the dehydrogenation of hydrocarbons could be effected merely by heating the hydrocarbons at an elevated temperature, but thermal dehydrogenation is accompanied by considerable cracking or severance of the carbon-carbon linkages. To avoid this difficulty catalytic dehydrogenation of hydrocarbons is used, and in this manner the corresponding less saturated hydrocarbon is produced almost quantitatively. It was found that chromia-alumina type catalysts are very useful for the catalytic dehydrogenation of hydrocarbons and that catalytic dehydrogenation reactions can be effected at less severe conditions than the thermal dehydrogenation reactions, but the use of this type of catalyst presented new problems, one of which is the need for regenerating the catalyst. It was further found that during the catalytic dehydrogenation reaction the catalyst became deactivated after a period of use, and this deactivation has been frequently attributed to the formation of carbon, tar and other carbonaceous materials during the reaction and to their deposition upon the catalyst. Regardless of the cause of the deactivation, it was also found that this type of dehydrogenation catalyst could be reactivated or regenerated and its catalytic activity thus restored by exposing the deactivated catalyst to an oxygen-containing gas at an elevated temperature. However, after a period of time during which the catalyst has been deactivated and regenerated frequently, the catalyst tends to become ineffective catalytically and to lose catalytic activity which is unrestorable by treatment with an oxygen-containing gas. Such loss of catalytic activity results in a decrease of the production of unsaturated hydrocarbons and shortened catalyst life, and it is quite apparent that a method that will increase the life of chromia-alumina dehydrogenation catalysts by inhibiting the unrestorable loss of catalytic activity would be advantageous, economical and highly desirable.

An object of this invention is to provide an improved method for the regeneration of hydrocarbon dehydrogenation catalysts. Another object of this invention is to provide a method for regenerating hydrocarbon dehydrogenation catalysts of the chromia-alumina type in such a manner that the active life of the catalyst is lengthened. A further object of this invention is to provide a method for obtaining increased production of unsaturated hydrocarbons from the catalytic dehydrogenation with a chromia-alumina catalyst of more saturated hydrocarbons by increasing the life of the catalyst. Another object of this invention is to increase the production of butylenes from the catalytic dehydrogenation of normal butane by reducing the rate of failure of unrestorable catalytic activity of the catalyst. Further objects will be apparent from the disclosure hereinafter.

I have found that the catalytically active life of a chromia-alumina type catalyst for the dehydrogenation of more saturated hydrocarbons to less saturated hydrocarbons can be lengthened by effecting the regeneration of such catalyst, after deactivation during the dehydrogenation reaction, with an oxygen-containing gas having a steam content not substantially above 25 volume per cent and preferably from 10 to 25 volume per cent. In general it is not new in the art to add steam to the gas for the regeneration of dehydrogenation catalysts, but the steam has been added in high concentrations as a means for controlling the temperature of the catalyst bed since the regeneration is a highly exothermic process and the excess sensible heat must be removed from the catalyst bed. It is also taught in the art that steam even in low concentrations in the regeneration gas for chromia-alumina catalysts, in particular should be avoided in order to prevent injury to the catalysts. The percentage of the steam in the steam-regeneration gas mixture for the regeneration of dehydrogenation catalysts has normally been about 90 volume per cent, and such high steam concentration not only poisons chromia-alumina catalysts but also causes a considerable decrease in the effective life of such catalysts by causing a high loss of restorable activity of the catalysts. As a consequence of the use of regeneration gas with a high steam content, the overall production of dehydrogenated products both in per-pass and ultimate yields is markedly decreased when using chromia-alumina catalysts. Improved overall production of dehydrogenated products and longer catalyst life may be obtained by carrying out the catalyst regeneration with relatively dry or moisture-free regeneration gas, but I have found, and the references hereinbelow to the accompanying drawings will substantiate these findings, that additional improvements in yields of the desired products and catalyst life are obtained, contrary to the teachings of the art, when the regeneration gas contains steam not substantially in excess of 25 volume per cent and preferably from 10 to 25 volume per cent.

In the practice of my invention I use as a catalyst chromium oxide, or chromia, on an alumina support, and this preferred catalyst may be promoted by minor proportions of metallic oxides such as oxides of beryllium, magnesium or vanadium. U. S. Patent Re. 21,911 describes a method of preparing catalysts that may be used in my process.

The conditions at which the dehydrogenation and catalyst regeneration reactions are effected are dependent upon the hydrocarbon that is used in the process, and the specific conditions are within the skill of the art. For example, in the dehydrogenation of butane with a chromia-alumina catalyst, the temperature at which the reaction is carried out varies from 900–1300° F., and the pressure is usually atmospheric although both subatmospheric and superatmospheric pressures may be used. To effect the regeneration of the catalyst I prefer to use a similar range of temperatures, viz. 900–1300° F., and pressures varying from atmospheric to 150 p. s. i.

The regeneration gas that is used to practice my invention is, as described above, an oxygen-containing gas. The presence of the oxygen is essential in order that the depositions upon the catalyst can be oxidized and thus removed. An example of a gas that may be used is air. Also, oxygen-enriched air or air from which some oxygen has been removed may also be used. Another excellent example is ordinary flue or stack gas or spent combustion gas. A flue gas generator may serve to charge the regeneration system during the first regeneration periods; thereafter the combustion products of the regeneration process may be used to constitute the inert portion of the regeneration gas by means of a recycle system. The oxygen content is maintained between two and three volume per cent by the introduction of a controlled amount of air, flue gas, or stack gas. Such gases are particularly useful in my process, since, in addition to oxygen, the gas is made up of such inert gases as carbon dioxide, nitrogen and steam. Actually I have found that the regeneration gas in a closed regeneration system contains about 16 volume per cent carbon dioxide, 2.5 to 3 volume per cent oxygen, 5 to 7 volume per cent steam, and the remainder nitrogen, but this composition is subject to variations over wide limits. In order to practice my invention it is merely necessary to increase the steam content of such gases to the desired volume per cent prior to use for the catalyst regeneration.

My invention is applicable to those dehydrogenation processes wherein a dehydrogenatable hydrocarbon is contacted with a "steam-sensitive" catalyst such as a chromia-alumina catalyst either with or without known promoting metallic oxides. My invention is particularly applicable to the dehydrogenation of aliphatic hydrocarbons, of which butane is a typical example, to form corresponding less saturated hydrocarbons. U. S. Patent 2,381,691 describes a butane dehydrogenation process to which my invention is readily adaptable. In addition to the dehydrogenation of aliphatic hydrocarbons, my invention can be used to dehydrogenate other hydrocarbons. Typical examples are the dehydrogenation of naphthenic hydrocarbons to form cyclo-olefins and aromatics and the dehydrogenation of alkyl aromatics to form aromatic hydrocarbons having unsaturated aliphatic substituent radicals such as the dehydrogenation of ethyl benzene to styrene.

Numerous methods, within the skill of the art, of preparing the chromia-alumina type catalysts that are used in practicing my invention have been and are currently used. For very complete descriptions of some of the methods of preparing these catalysts see U. S. Patents 2,379,172, 2,386,499, 2,386,518 and 2,337,628. These patents disclose only a few of the various methods of catalyst preparation that may be used. For example, the catalysts that I use may be prepared by a gelatinous co-precipitation method wherein an alkali, such as ammonium hydroxide is added to a solution of chromium and aluminum salts to form hydrous oxides of these metals. The inorganic compounds resulting from the reaction are then separated by suitable means, such as washing by decantation and/or filtration, and the hydrous oxides are dried to reduce the water content to a desired level. The gel is then cut by any convenient means, such as passage through a coarse mesh screen, to produce the desired particle size, and these pieces are dried to reduce the water content and to produce the hard, catalytic, gel material. Another method of cutting up the partially dried gel material is by extrusion of the gelatinous mass into rod-like forms which are then broken or cut up to form pellets. In some cases it is desirable to add such organic colloidal material as gelatin, vegetable gum or agar to the metal salt solutions or to the hydrous oxides after the washing operation. The hard, catalytic material resulting from this method of preparation may be used in the practice of my invention, but, if desired, such materials may have added thereto such supporting substances as pumice, unglazed porcelain, charcoal, kieselguhr, etc., which have been added to the gelatinous material prior to the first drying operation.

Instead of coprecipitating gels of the oxides of chromium and aluminum, it is sometimes desirable to precipitate gels of these metallic oxides separately and then intimately admix the gelatinous precipitates by trituration. The mixture of oxides may then be treated in a manner similar to that described above in order to obtain the dried, hard, catalytic material.

Another method of preparing the chromia-alumina type catalysts is to impregnate porous alumina pellets with a hydrosol prepared by melting or dissolving a salt, such as chromic acetate, chromic chloride, chromic nitrate, or the like, in water and then adding a concentrated alkaline solution, preferably aqueous ammonia, to form a precipitate. The hydrosol is then poured over the alumina pellets, and the mixture is stirred until all or nearly all the sol is absorbed or deposited in and on the pellets. The pellets are then dried, preferably in air at a slightly elevated temperature, and the pellets may then be used to catalyze a hydrocarbon dehydrogenation reaction.

Another method of preparing the catalyst that is used in my invention is to dip pills or pellets of alumina in a saturated solution of chromium trioxide. This method will be described more fully below in the discussion of experimental work that has been performed while practicing my invention.

The advantages and utility of my invention are readily apparent from the accompanying drawings. Figure 1 demonstrates the desirability of using relatively low concentrations of steam in the regeneration gas for a butane dehydrogenation process in preference to steam concentrations of 50 per cent and higher. The data for this drawing were obtained with a dehydrogenation catalyst containing 18 weight per cent chromia and 82 weight per cent alumina that was prepared by dipping incompletely calcined alumina pills, ⅛" in length and diameter, in a saturated solution of chromium trioxide, draining, drying and calcining the dipped pills. Because of the incomplete calcination of the alumina pills, leaving lubricant in the center, only about three-fourths of each pill was impregnated, causing surface concentrations of chromic oxide as high as 27 per cent. Into contact with a catalyst thus-prepared was passed n-butane and, after a dehydrogenation period of 60 minutes, the catalyst was regenerated with a gas containing 5 volume per cent oxygen in admixture with inert gases. In order to obtain the comparative data for the drawing it was necessary to make four complete and separate runs wherein the steam content of the regeneration gas was as shown on the drawings, viz. 0, 10%, 25% and 50%. The dehydrogenation and regeneration cycles, as described above, were continued alternately over a period of 1100 hours for each run during which the data for Figure 1 were obtained. The operation conditions were: atmospheric pressure, dehydrogenation and regeneration temperature 1050° F., butane and regeneration gas space velocities of 750 to 3000 volumes (STP), respectively, per volume of catalyst per hour, and the catalysts were flushed with nitrogen for 3 minutes before and after each dehydrogenation period. At intervals of about eight days the activity and life of each catalyst were determined by ascertaining butane and butadiene production by low-temperature fractional distillation analysis of the total dehydrogenation effluent.

Figure 1 clearly shows that it is highly preferable to use a regeneration gas containing not substantially more than 25 volume per cent steam instead of 50 or more volume per cent, and it shows further that regeneration gas containing from 10 to 25 volume per cent steam produces better results than dry regeneration gas.

Figure 2 is a graphical comparison of the cumulative production in millions of gallons of normal butylenes from the dehydrogenation of normal butane that is obtained when the catalyst is regenerated with regeneration gas containing no steam and 15 volume per cent steam. A dehydrogenation catalyst containing about 12 weight per cent chromia, 2 weight per cent magnesia, and about 86 weight per cent alumina is used to catalyze the reaction. The catalyst has substantially the same initial activity in both cases. The catalyst was prepared by dipping completely calcined alumina pills, ⅛" in length and diameter, in a solution containing chromium trioxide and magnesium carbonate, draining, drying and calcining the dipped pills. The dehydrogenation is carried out at conditions of temperature and pressure that are used in commercial operation, i. e., 1000–1100° F., atmospheric pressure and space velocity of 650 volumes of butane per volume of catalyst per hour. As the graph shows, two situations are considered, one in which the regeneration gas contains no steam and the other in which the steam content is 15 volume per cent. Each situation considered includes dehydrogenating and regenerating cycles and extends over a period of 80 days. The regeneration is effected at a slightly higher temperature of 1100–1200° F. and 50–150 p. s. i. a. For regeneration a gas containing 1 to 5 per cent oxygen and the remainder inerts is used.

Figure 2 demonstrates that, when 10 to 25 volume per cent steam, and specifically 15 volume per cent, is added to the regeneration gas in a hydrocarbon dehydrogenation process using a chromia alumina catalyst, the total production of unsaturated hydrocarbons over a period of 80 days is considerably higher than when no steam is present in the regeneration gas. Actually, the graph shows that the increase in cumulative production is about 10 per cent. A study of Figures 1 and 2 shows that chromia-alumina dehydrogenation catalysts, when regenerated with an oxygen-containing gas having a steam content of 10 to 25 per cent, are much superior to those catalysts that are regenerated with a dry regeneration gas, and they have a very marked superiority over those catalysts that are regenerated with a gas having a steam content above my preferred range.

In the actual practice of my invention the dehydrogenation catalyst may be regenerated in a chamber separate from the dehydrogenation chamber or it may be effected in situ, i. e., by interrupting the dehydrogenation reaction and then passing the regeneration gas into contact with the catalyst, but in either case the improved results that I have pointed out above will be noted. Also, the regeneration of the catalyst, as well as the dehydrogenation reaction, may be carried out by using either a stationary bed or a "fluidized" bed of powdered catalyst. It is preferable to use the stationary bed type of regeneration when the catalyst particles are relatively coarse, and then the regeneration gas is passed through the bed of catalyst. The fluidized bed type may be used when the catalyst particles are relatively fine, i. e., at least 65 mesh size. For this type of operation the regeneration gas is passed upwardly through the fine catalyst particles at a linear velocity of 0.6 to 5.5 feet per second which is sufficient to "fluidize" the catalyst or to put it into a state of turbulence. Either method of regeneration may be used, but the fluidized bed type has the advantage of providing intimate contacting between the catalyst particles and the regeneration gas which usually results in more rapid regeneration.

Numerous modifications within the scope of my invention will be apparent to those skilled in the art of dehydrogenation.

I claim:

1. The improved method of regenerating a catalyst comprising alumina and chromia for the dehydrogenation of a dehydrogenatable hydrocarbon which comprises contacting said catalyst after deactivation by carbonaceous deposits thereon during said dehydrogenation with an oxygen-containing regeneration gas having a steam content of from 10 to 25 volume per cent until said carbonaceous deposits are removed.

2. The improved method of regenerating a steam-sensitive catalyst comprising alumina and chromia for the dehydrogenation of aliphatic hydrocarbons which comprises contacting said catalyst after deactivation by carbonaceous deposits thereon during said dehydrogenation with an oxygen-containing regeneration gas having a steam content of from 10 to 25 volume per cent until said carbonaceous deposits are removed.

3. A method according to claim 2 wherein the oxygen-containing gas is air.

4. A method according to claim 2 wherein the oxygen-containing gas contains 1 to 5 per cent oxygen prior to the addition of the steam.

5. A method according to claim 2 wherein the regeneration gas has a steam content of 15 volume per cent.

6. A method according to claim 2 wherein the catalyst contains 20 weight per cent chromia and 80 weight per cent alumina.

7. A method according to claim 6 wherein the catalyst is prepared by dipping alumina pellets in a saturated solution of chromium trioxide and heating the thus-impregnated pellets to dryness.

8. In the catalytic dehydrogenation of more saturated hydrocarbons in the presence of a catalyst comprising oxides of aluminum and chromium to produce corresponding less saturated hydrocarbons, the method of lengthening the catalytically active life of said catalyst and of increasing the cumulative production of less saturated hydrocarbons from said catalyst which comprises regenerating said catalyst after deactivation by carbonaceous deposits thereon during said dehydrogenation in the presence of an oxygen-containing gas having a steam content of from 10 to 25 volume per cent until said carbonaceous deposits are removed.

9. A method according to claim 8 wherein the more saturated hydrocarbon is n-butane and the less saturated hydrocarbons are n-butenes and butadiene.

10. A method according to claim 8 wherein the more saturated hydrocarbon is at least one n-butene and the less saturated hydrocarbon is butadiene.

11. A method according to claim 8 wherein the oxygen-containing gas is air.

12. A method according to claim 8 wherein the oxygen-containing gas contains 1 to 5 per cent oxygen.

13. A method according to claim 8 wherein the regeneration gas has a steam content of 15 volume per cent.

14. A process for catalytically dehydrogenating aliphatic hydrocarbons which comprises contacting said hydrocarbons at a dehydrogenating temperature with a catalyst comprising oxides of aluminum and chromium until the activity of said catalyst is decreased by carbonaceous deposits thereon, contacting said thus-deactivated catalyst with an oxygen-containing gas having a steam content of 10 to 25 volume per cent until said carbonaceous deposits are removed, contacting said thus-regenerated catalyst with the aliphatic hydrocarbons to be dehydrogenated, and recovering the dehydrogenation products resulting from the above dehydrogenation process.

15. A process according to claim 14 wherein the aliphatic hydrocarbon is n-butane and the resulting product comprises butylenes and butadiene.

GEORGE H. HANSON.

REFERENCES CITED

The following references are of record in the file of this patent:

UNITED STATES PATENTS

| Number | Name | Date |
|---|---|---|
| 2,399,678 | Houdry et al. | May 7, 1946 |